(12) United States Patent
Drizo et al.

(10) Patent No.: US 8,721,885 B2
(45) Date of Patent: May 13, 2014

(54) SYSTEM FOR REMOVING PHOSPHORUS FROM WASTEWATER

(75) Inventors: Aleksandra Drizo, Bedford (CA); Hugo Picard, Bedford (CA)

(73) Assignees: Aleksandra Drizo, Bedford (CA); Hugo Picard, Bedford (CA)

( * ) Notice: Subject to any disclaimer, the term of this patent is extended or adjusted under 35 U.S.C. 154(b) by 190 days.

(21) Appl. No.: 12/807,177

(22) Filed: Aug. 30, 2010

(65) Prior Publication Data

US 2012/0048806 A1 Mar. 1, 2012

(51) Int. Cl.
*C02F 3/00* (2006.01)
*C02F 1/28* (2006.01)

(52) U.S. Cl.
USPC ........ 210/259; 210/283; 210/284; 210/502.1; 210/906

(58) Field of Classification Search
USPC ............... 210/259, 284, 683, 685, 906, 283, 210/502.1, 617
See application file for complete search history.

(56) References Cited

U.S. PATENT DOCUMENTS

| | | | |
|---|---|---|---|
| 4,333,837 A | 6/1982 | Plosz et al. | |
| 4,427,549 A * | 1/1984 | Brown et al. | ................. 210/662 |
| 4,704,048 A | 11/1987 | Ahlgrimm | |
| 4,814,097 A | 3/1989 | Napier et al. | |
| 4,880,333 A | 11/1989 | Glasser et al. | |
| 5,169,534 A | 12/1992 | Maddalone | |
| 5,330,651 A | 7/1994 | Robertson et al. | |
| 5,366,634 A | 11/1994 | Vijayan et al. | |
| 5,876,606 A | 3/1999 | Blowes | |
| 6,379,543 B1 * | 4/2002 | Bowman | ................. 210/170.03 |
| 6,706,171 B2 | 3/2004 | Lee et al. | |
| 6,858,142 B2 * | 2/2005 | Towndrow | ................... 210/602 |
| 6,998,038 B2 | 2/2006 | Howard | |
| 7,476,321 B2 | 1/2009 | Hedegaard | |
| 7,563,373 B2 | 7/2009 | Bolduc | |
| 7,713,423 B2 | 5/2010 | Moller et al. | |
| 2006/0141605 A1 * | 6/2006 | Kumar et al. | .............. 435/262.5 |
| 2006/0157407 A1 * | 7/2006 | Cummings | ................... 210/617 |
| 2008/0078720 A1 | 4/2008 | Drizo et al. | |

OTHER PUBLICATIONS

Mayes et al, Buffering of Alkaline Steel Slag Leachate across a Natural Wetland, Jan. 2006, Environmental Science and Technology, vol. 40, No. 4, pp. 1237-1243.*

Naylor et al, Treatment of freshwater fish farm effluent using constructed wetlands: the role of plants and substrate, Nov. 2003, Water Science and Technology, vol. 48, No. 5, pp. 215-222.*

(Continued)

*Primary Examiner* — Matthew O Savage
(74) *Attorney, Agent, or Firm* — Andrew M. Calderon; Roberts Mlotkowski Safran & Cole, P.C.

(57) ABSTRACT

Systems and methods for removing phosphorous (P) from P-containing wastewater are disclosed. The system includes a main filter unit (MFU) comprising P-adsorbing material. The MFU receives the P-containing wastewater and forms therefrom MFU-filtered wastewater having a first pH. A pH adjusting unit (AU) that contains pH-reducing material receives the MFU-filtered wastewater and forms therefrom AU-filtered wastewater having a second pH lower than the first pH. A replaceable filter unit (RFU) similar to the MFU but smaller may be arranged upstream of the MFU to pre-filter the P-containing wastewater. Some or all of the RFU may be replaced when maintaining the system.

10 Claims, 13 Drawing Sheets

(56) References Cited

OTHER PUBLICATIONS

Bird et al., "Investigations on phosphorus recovery and reuse as soil amendment from electrical furnace slag filters," J. Env. Sci & health Part A (2009) 44, 1-8.

Chazarenc et al., "Active filters: a mini review . . . ," 11$^{th}$ cent. on wetland systems for water pollution control, Nov. 1-7, 2008 Indone, India.

Drizo et al., "Physico-chemical screening of phosphate-removing substrates for use in constructed wetland systems"; Wat. Res., vol. 33, No. 17 pp. 3595-3602, 1999.

Drizo et al., Phosphorus saturation potential: A parameter for estimating the longevity of constructed wetland systems Environ. Sci. Technol. 2002, 36, 4642-48.

Drizo et al., "New Evidence for rejuvination of phosphorus retention capacity in EAF steel slag," Environ. Sci. Technol., 2008, 42, 6191-97.

Shilten et al., "Phesphorus removal by an "active" slag filter—a decade of full-scale experience." Water Research 46 (2006) 113-118.

Bryant et al., "Filtering phosphorus and heavy metals from ditch drainage water using by products," USDA Ag. Research Service Abstract, Aug. 12, 2010.

Weber et al., "Upgrading constructed wetlands phosporus reduction from a dairy efficient using electric arc furnace steel slag filters," Water Sci & Tech. vol. 56 No. 3 pp. 135-143 (2007).

Westholm, "Substrates for phosphorus removal—potential benefits for on-site wastewater treatment," Water research 40 (2006) 23-26.

International Search Report and Written Opinion for PCT/US2011/01441, mailed to Applicant on Dec. 23, 2011.

Hylander et al., "Phosphorus releuchen in filter materials for wastewater treatment and its subsequent suitability for plant production" published on-line Jun. 16, 2005 Bioresource Technology, vol. 97, Issue 7 pp. 914-921.

International Search Report and Written Opinion for PCT/US2012/000334, mailed to Application on Oct. 10, 2012.

\* cited by examiner

SYSTEM FOR REMOVING PHOSPHORUS FROM WASTEWATER

STATEMENT OF GOVERNMENTAL SUPPORT

This invention was made with U.S. Government support under Grant No. 2008-35102-19222 and ID No. 021010 awarded by the United States Department of Agriculture National Research Initiative (NRI) Water and Watersheds and Hatch Special Research Grants Programs. The U.S. Government therefore has certain rights in this invention.

CROSS-REFERENCE TO RELATED APPLICATIONS

This Application is related to U.S. patent application Ser. No. 12/136,646, filed in the USPTO on Aug. 5, 2011.

FIELD OF THE DISCLOSURE

The present disclosure relates generally to water pollution treatment and control, and in particular to systems and methods for phosphorous removal from phosphorous-containing wastewater.

BACKGROUND ART

Over the course of human history, on-site wastewater treatment systems have evolved from pit privies to installations capable of producing a disinfected effluent fit for human consumption. Modern conventional on-site wastewater treatment systems consist primarily of a septic tank and a soil absorption field, also known as a subsurface wastewater infiltration system.

It has been estimated that in 2007, about 20% of U.S. households (i.e., about 26.1 million houses), utilized on-site septic systems, a majority of which were installed decades ago and have long since passed their recommended replacement dates.

The primary pollutants released from on-site septic systems are nitrogen (N), phosphorus (P), and disease-causing pathogens. Of these, problems associated with P pollution have been recognized as an increasing worldwide concern due to the role of P in accelerating eutrophication. Consequently, governmental agencies across the world have established or are in the process of establishing regulations for wastewater discharges originating from point sources, such as municipal treatment plants, industry discharges from factories, houses, housing developments, etc., as the most expedient means of reducing P pollution. The increasingly stringent regulations increase the cost of treating wastewater from point pollution sources, and motivate the need for new technologies to provide efficient P removal from wastewater generated by such sources.

Existing technologies for P removal from wastewater generated by point pollution sources suffer from three major shortcomings. The first is that they cannot achieve the high level of P filtration required by present and anticipated regulations (e.g., 1 mg/L presently and perhaps as low as 0.03 mg/L in the near future). The second is that a few emerging technologies generate a highly alkaline filtered effluent, which is known to be detrimental to the environment, and in particular to fish and other aquatic life. The third major shortcoming is that they are energy intensive and require a high level of maintenance.

SUMMARY

An aspect of the disclosure is a system for removing P from P-containing wastewater while maintaining the effluent pH at substantially neutral levels. The system includes a main filter unit (MFU) comprising P-adsorbing material, wherein the P-adsorbing material forms from the P-containing wastewater MFU-filtered wastewater having a first pH. The system also includes a pH adjusting unit (AU) in fluid communication with the MFU. The AU contains pH-reducing material. The MFU-filtered wastewater flows through the pH-reducing material of the AU to form AU-filtered wastewater having a second pH that is lower than the first pH.

Another aspect of the disclosure is a method of treating P-containing wastewater having a first amount of P. The method includes flowing the P-containing wastewater through a MFU having P-adsorbing material to generate MFU-filtered wastewater having a second amount of P less than the first amount of P and having a first pH. The method also includes flowing the MFU-filtered wastewater through an AU having pH-reducing material to form AU-filtered wastewater having a second pH that is lower than the first pH.

Additional features and advantages of the disclosure will be set forth in the detailed description that follows, and in part will be readily apparent to those skilled in the art from that description or recognized by practicing the disclosure as described herein, including the detailed description which follows, the claims, as well as the appended drawings.

It is to be understood that both the foregoing general description and the following detailed description present embodiments of the disclosure, and are intended to provide an overview or framework for understanding the nature and character of the disclosure as it is claimed. The accompanying drawings are included to provide a further understanding of the disclosure, and are incorporated into and constitute a part of this specification. The drawings illustrate various embodiments of the disclosure, and together with the description serve to explain the principles and operations of the disclosure.

Figure 1A:
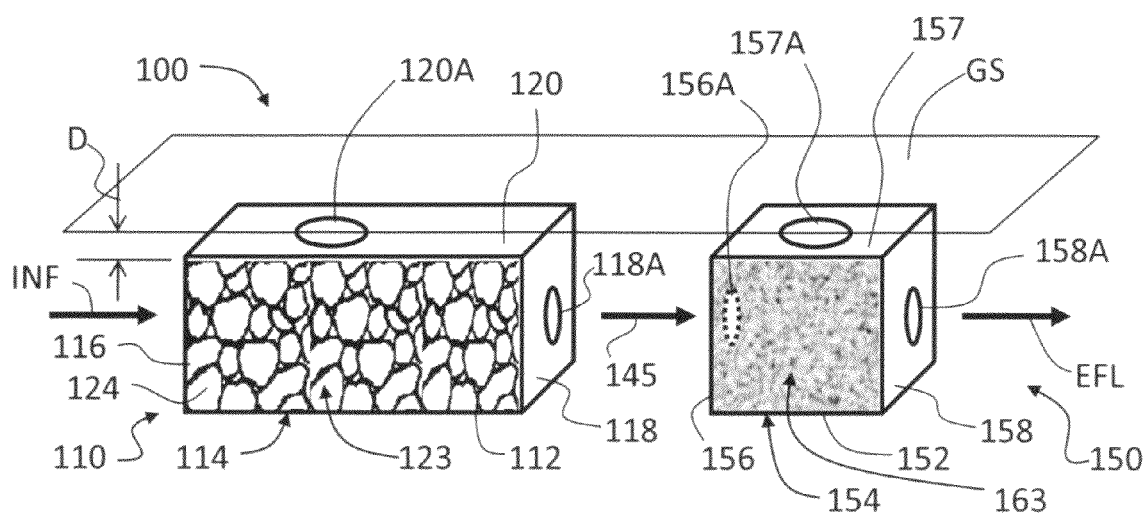
FIG. 1A is an isometric view of an example embodiment of a P filter system according the disclosure, with the P filter system having a main filter unit (MFU) upstream of and in fluid communication with a pH adjustment unit (AU)

The various elements depicted in the drawing are merely representational and are not necessarily drawn to scale. Certain sections thereof may be exaggerated, while others may be minimized. The drawings are intended to illustrate example embodiments of the disclosure that can be understood and appropriately carried out by those of ordinary skill in the art.

DETAILED DESCRIPTION

The present disclosure is directed to systems and methods for P removal and sequestration of P pollutants from P-containing wastewater (influent) to ensure that that the filtered wastewater (effluent) meets stringent discharge requirements for P while maintaining pH discharge levels at or near neutral as required by water quality regulations. While the systems and methods disclosed herein are well suited for treating point sources of P pollution, their applicability is not so limited and can also be used effectively for non-point sources of P pollution as well.

US Patent Application Pub. No 2008/00778720 A1 having U.S. patent application Ser. No. 11/862,765 and filed on Sep. 27, 2006, and entitled "System and method for removing phosphorus from non-point pollution sources," is incorporated by reference herein.

In the description herein, the terms "upstream" and "downstream" are relative to the direction of the flow of wastewater, which in the Figures is shown generally as being from left to right.

Also in the description herein, amounts of P can be divided into three components: soluble reactive phosphorus (SRP) or soluble inorganic P; soluble unreactive or soluble organic phosphorus (SOP); and particulate phosphorus (PP), with the sum of SRP and SOP being called soluble or "dissolved" P. Dissolved P and PP are differentiated by whether or not they pass through a 0.45 micron membrane filter. "Total P" (TP) includes the sum of all P components (SRP, SOP and PP). It is generally accepted in the art that 90% of phosphorus in sewage wastewater is in dissolved inorganic form.

P Filter with pH Adjustment Unit

FIG. 1A is an isometric view of an example embodiment of a P filter system 100. The ground surface GS is shown for reference only in FIG. 1A and illustrates an example embodiment where P filter system is arranged underground. Other embodiments of P filter system 100 can include some or all of the main system components being above ground.

filter system 100 includes a main filter unit (MFU) 110 and a pH adjustment unit (AU) 150 in fluid communication with the MFU. This type of P filter system is referred to below in some cases as a "MFU+AU P filter system" for short. MFU 110 includes a container 112 that defines a cavity 114 with an input end 116, an output end 118 and an optional top 120. In example embodiments, container 112 is made of plastic, concrete, fiberglass or other prefabricated materials (or combinations thereof) that are substantially resistant to corrosion or environmental degradation when buried underground. Input end 116, output end 118 and top 120 of container 112 have respective apertures 116A (see FIG. 1D), 118A and 120A. Aperture 120A can be used by a system operator for inspecting MFU 110. Apertures 116A and 118A facilitate the flow of P-containing wastewater (influent) INF through P filter system 110. In an example, apertures 116A and 118A are configured to ensure the subsurface flow of P-containing wastewater through the system. In an example, apertures 116A and 118A are arranged 10 cm to 20 cm below top 120.

Cavity 114 is either partially or completely filled with a mass 123 of loose pieces 124 of P-adsorbing material, such as steel slag, for example, crushed or palletized, or other material (e.g., calcium and/or iron based adsorbing material) having the ability to remove phosphorous from P-containing wastewater. Combinations of different P-adsorbing materials can be used to constitute mass 123.

Container 112 is shown as being rectangular for ease of illustration. However, container 112 can have any shape suitable for the P-adsorbing material to perform its P-filtering function. In some cases, container 112 is configured to conform to the environment in which P filter system 100 is placed, such as in a basin that has sloped sidewalls or an irregular shape often associated with earthen structures.

Figure 1B:
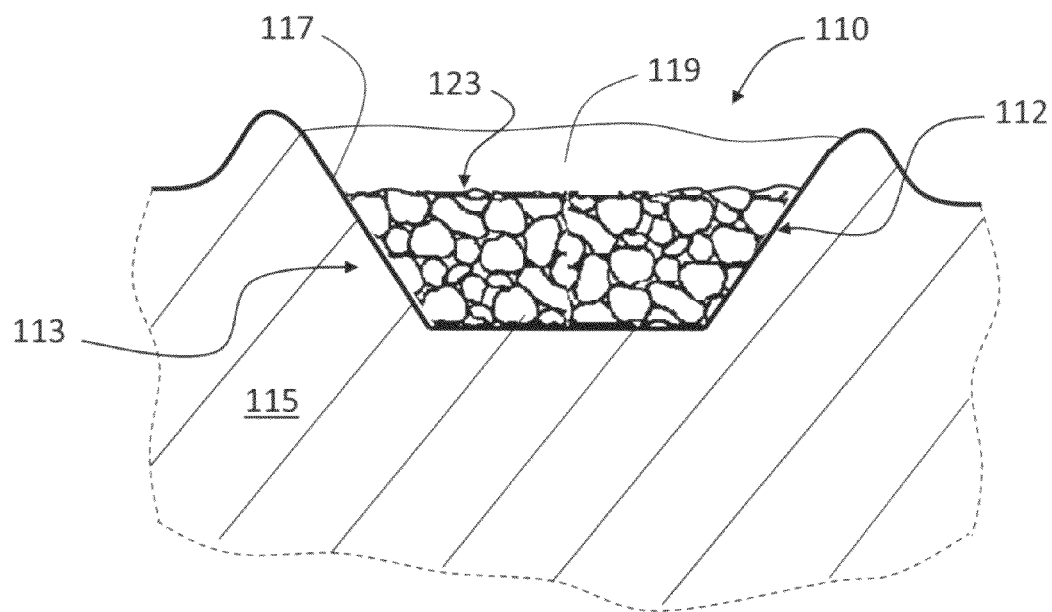
FIG. 1B is a cross-sectional view of an example MFU as formed in a basin dug into the ground, and where the MFU container is defined by a impermeable liner that covers at least a portion of the basin.

FIG. 1B is a cross-sectional view of an example MFU 110 as formed in a basin 113 dug into soil 115. Here, container 112 is defined by liner 117 that lines at least a portion of basin 113 to prevent percolation of the wastewater into groundwater. Example liners include a geomembrane liner such as made from Polyvinyl Chloride or PVC, which is commonly used as a liner for storage ponds and water/wastewater holding tanks. An earthen (e.g., soil) layer 119 can be arranged atop mass 123 to ensure that the MFU 110 to ensure that the MFU processes P-containing subsurface wastewater INF.

In the example P filter system 100 of FIG. 1A, MFU 110 is configured to operate in a subsurface mode, i.e., is located below ground surface GS at a depth D and is configured to receive P-containing wastewater INF running substantially lateral to and beneath the ground surface GS. However, other modes of operation and configurations for P filter system 100 can be employed, such as for example feeding in a vertical mode (from the top down) or even from the bottom to the top.

Various types of steel slag, for example, slag from a steelmaking process produced in integrated steel mills where iron ore is melted utilizing blast furnaces (BF slag) or slags produced in electric arc furnace (EAF) "mini-mills" by melting scrap steel, are known to have the ability to adsorb a substantial amount of P and are thus suitable for use as the P-adsorbing material (mass) 123 for MFU 110. The present inventors have found electric arc furnace (EAF) steel slag to have very favorable P retention and sequestration properties. That said, other steel slag types (BF, Basic Oxygen Slag (BOF), for example) can be used in MFU 110. Pieces 124 may have a variety of sizes, with an example size range being in the range from 8 mm to 30 mm. In an example, pieces 124 have size distribution selected so that P-containing wastewater INF has a hydraulic residence time (HRT) in MFU 110 of at least 12 hours.

When steelmaking slag is used as the P-adsorbing material, MFU 110 removes (sequestrates) P from the P-containing wastewater INF by specific absorption on metal hydroxides (e.g., Fe—P precipitation and formation of the Fe(II) mineral vivianite ($Fe_3(PO_4)_2 \cdot 8H_2O$)) and calcium phosphate precipitation (e.g., hydroxyapatite (HAP)) via the slag and by bacterial uptake at specific HRTs. Such a P filter is inexpensive, has minimal land requirements, requires little or no energy (depending on whether pumps are used), and offers flexibility in installation. It also is highly efficient in removing P from point pollution sources (85-100%) as well as from non-point (diffuse) pollution sources, e.g., can remove about 70% to about 90% of P and about 40% to about 80% of suspended solids from agricultural runoff (e.g., farm ditches, drainage tiles, culverts, manure and feedbunks leachate, etc.) containing various (total) P concentrations, e.g., from as low as 0.1 mg/L up to 100 mg/L. In an example, the sequestrated P is plant bio-available and can be reused as soil amendment to support plant growth in horticulture, forestry, agriculture or vegetation re-establishment in acid mines reclamation.

Figure 1C:
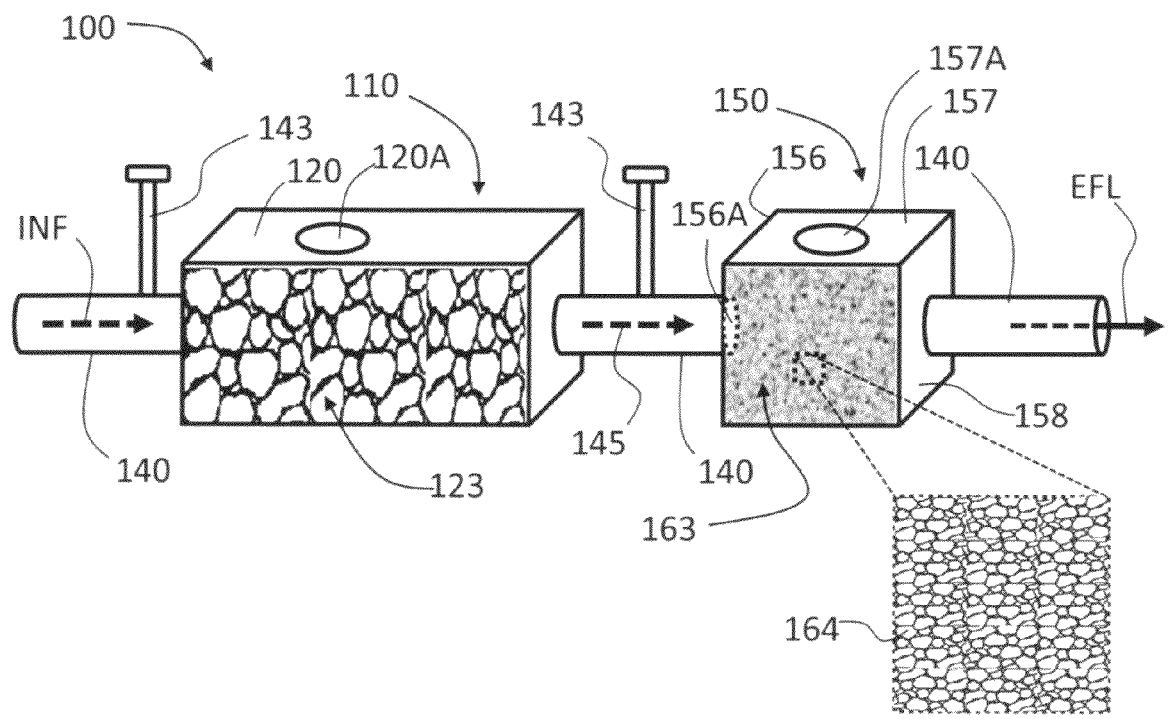
FIG. 1C is similar to FIG. 1A and illustrates an embodiment where the MFU and AU are spaced apart and fluidly connected via pipes.

In an example embodiment illustrated in FIG. 1C, MFU 110 and AU 150 are spaced apart and fluidly connected by one or more pipes 140. An example type of pipe 140 is a PVC pipe. Likewise in an example, influent INF is fluidly communicated into input end 116 of MFU 110 via one or more pipes 140. Pipes 140 are preferably sealed so that fluid communication therethrough is water tight. In an example, one or more valves 143 are operably arranged in pipes 140 so that the flow of wastewater through P filter system 100 can be controlled. The P-containing wastewater INF, after being filtered by MFU 110, is referred to herein as "MFU-filtered wastewater" 145. MFU-filtered wastewater 145 is provided to and is processed by AU 150 and discharged therefrom as effluent EFL, which is referred to as "AU-filtered wastewater."

With reference again to FIG. 1A, AU 150 includes a container 152 that defines a cavity 154 having a input end 156 with an aperture 154A, and an output end 158 having an aperture 158A. Cavity 154 is partially or completely filled with pH-reducing material (mass) 163. In an example embodiment, mass 163 comprises pieces 164, which in an example are pieces of loose charcoal or other carbon-rich materials, for example coal, shale, wood (e.g., woodchips) or combinations thereof (see inset of FIG. 1C). In an example, the charcoal is derived from hardwoods, softwoods or other organic materials, such as nut shells.

In example embodiment, pieces 164 have a size distribution that allows wastewater flow through mass 163 while decreasing the pH of MFU-filtered wastewater 145 from being alkaline to a substantially neutral level in AU-filtered wastewater EFL. An example size distribution of pieces 164 making up mass 163 is in the range between 10 mm and 40 mm in diameter.

Container 152 may be made of plastic, concrete, fiberglass or other prefabricated materials, and can optionally have a top 157 with an aperture 157A to facilitate access by system operators for system maintenance. In an example, the pH of the AU-filtered wastewater EFL is lower than that of the MFU-filtered wastewater 145, i.e., is closer to neutral levels. In an example embodiment, AU 150 has a volume that is three to five times (i.e., 3× to 5×) less than the volume of MFU 110.

In an example embodiment, mass 163 comprises of loose pieces 164 of charcoal, coal and/or shale (see inset of FIG. 1C), but can also comprise of a mix of materials where at least 25% of the AU-filter volume is filled with pieces 124 of loose steel slag (or other calcium or iron based adsorbing material), while the remaining 75% of the filter volume comprises loose pieces 164 of charcoal, coal, shale or wood, with the pieces making up both materials having a size distribution that allows MFU-filtered wastewater 145 to flow therethrough in forming AU-filtered wastewater EFL.

Charcoal, coal and shale are rich in carbon, and their surfaces support the attachment of microorganisms, which decompose organic matter present in wastewater. Decaying organic matter releases $CO_2$, thus altering the $CO_2$ levels in the wastewater and decreasing the pH of the resulting effluent EFL to make it less alkaline. Thus, the pH is substantially neutralized in AU 150 by altering the $CO_2$ concentration in MFU-filtered wastewater 145 and via buffering with carbonate and other minerals formed during passage of the MFU-filtered wastewater through the AU. Thus, the AU-filtered wastewater EFL discharged from the AU 150 has a pH that is generally less alkaline than (i.e., has a pH lower than) the MFU-filtered wastewater 145. In an example embodiment, AU-filtered wastewater EFL has a pH preferably equal to or less than 9, more preferably less than 8.5, and even more preferably in the range between 7 and 8. In another example, the AU-filtered wastewater 145 has a pH in the range between 7 and 9.

As with MFU 110, AU 150 can also be formed in a basin 113 using liner 117 and mass 163 supported therein in analogous fashion to the configuration for MFU 110 shown in FIG. 1B.

An example HRT for AU 150 is 10 hours or less. In an example embodiment, the HRT for AU 150 is less than the combined HRT for MFU 110 and the RFU 210 (introduced and discussed below).

Figure 1D:
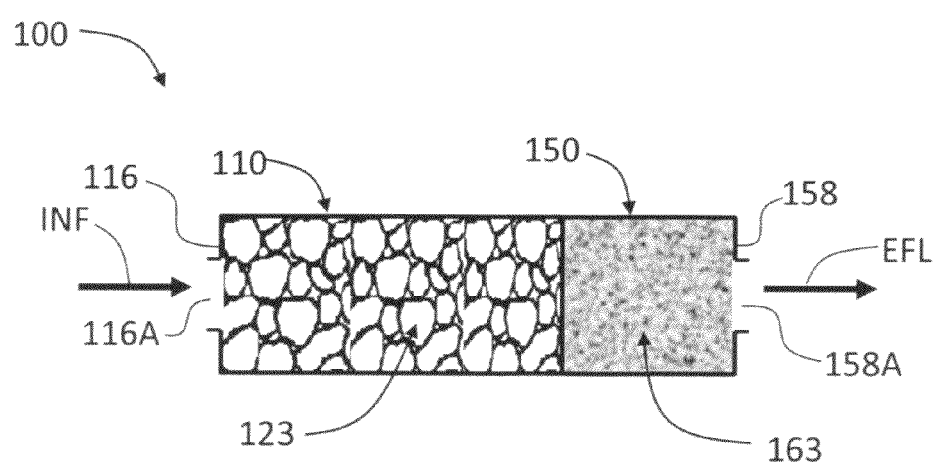
FIG. 1D is a side view of an example P filter system similar to that of FIGS. 1A and 1B, where the MFU and the AU are arranged immediately adjacent one another.

FIG. 1D is a side view of an example embodiment of P filter system 100, wherein MFU 110 and AU 150 are arranged immediately adjacent one another so that MFU-filtered wastewater 145 flows directly from the MFU to the AU without having to flow through a pipe 140 or any intervening medium, such as a section of earth in which the P filter system may be embedded.

Figure 2A:
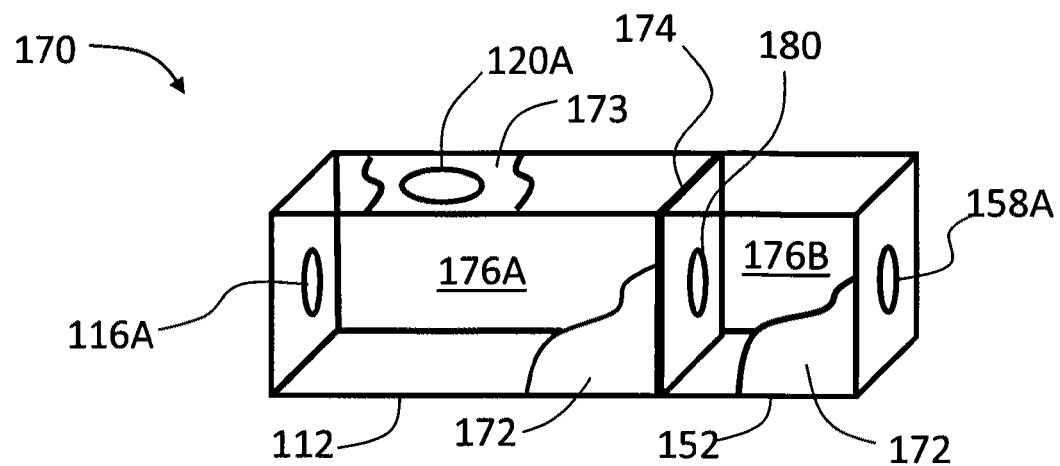
FIG. 2A and FIG. 2B are isometric views of an example container used to house both the MFU and the AU, with FIG. 2B illustrating an embodiment where the internal dividing wall is in the form of a screen.

FIG. 2A is an isometric view of an example container 170 that includes sidewalls 172 and an optional top 173 that, along with an internal dividing wall 174, defines adjacent compartments 176A and 176B that effectively serve as respective containers 112 and 152 for MFU 110 and AU 150. In an example, container 170 is made of plastic, fiberglass, concrete or other pre-fabricated material. As those skilled in the art will readily appreciate, internal dividing wall 174 may be made of any particular material suitable for the application. For example, it can be an existing wall of container 172, and can include one or more apertures 180 sized to allow for a desired amount of flow of MFU-filtered wastewater 145 between MFU 110 and AU 150. Optional top 173 may also include one or more apertures 120A for inspecting MFU 110 formed in compartment 176A and/or AU 150 formed in compartment 176B.

Figure 2B:
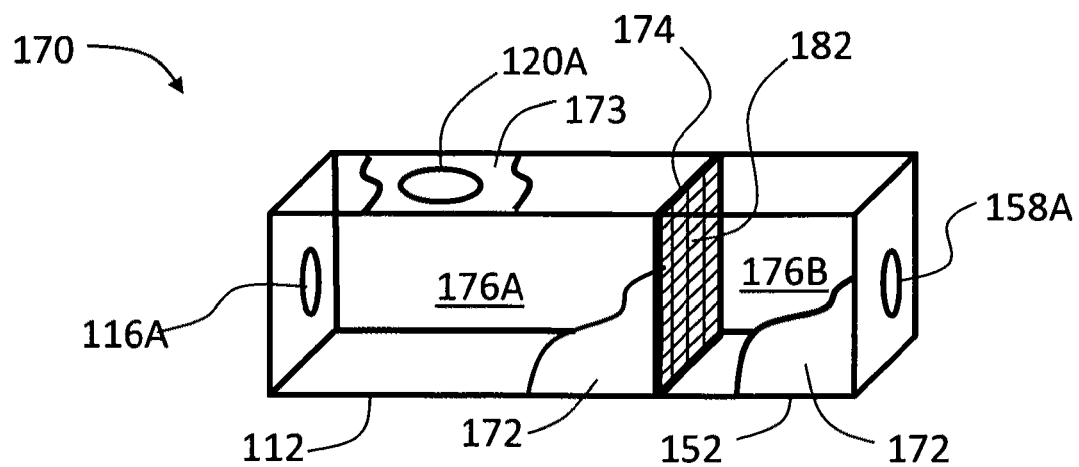

FIG. 2B is similar to FIG. 2A and illustrates an example embodiment of container 170 wherein internal dividing wall 174 is in the form of a screen having openings 182 that allow MFU-filtered wastewater 145 to flow from MFU 110 to AU 150. Openings 182 need not be square or even rectangular and in fact can be any shape that allows for wastewater to flow while serving to separate the different materials making up MFU 110 and AU 150. Example openings 182 have a maximum dimension of less than 7 mm.

P-Filter with Replaceable Filter and pH Adjustment Unit

In some situations, such as when treating wastewater flows of greater than about 3 $m^3$/day (a common flow volume for a cluster of houses, commercial or municipal wastewater sites, hotels, etc.), MFU 110 may become clogged with various types of solids over the lifetime of the system, which in many cases is anticipated to be 15-20 years. Accordingly, to achieve and maintain a select P concentration limit in AU-filtered wastewater EFL (e.g., <1 mg/L) over prolonged periods, it is desirable to have a way of rejuvenating the P filter system.

Figure 3A:
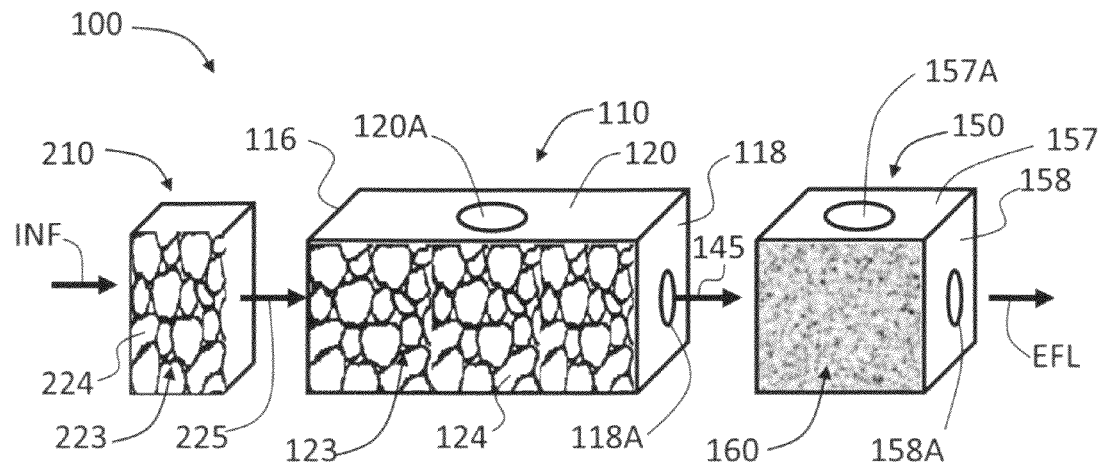
FIG. 3A and FIG. 3B are isometric views of example embodiments of a P filter system similar to FIGS. 1A and 1C, with the P filter system further including a replaceable filter unit (RFU) upstream of and in fluid communication with the MFU.
Figure 3B:
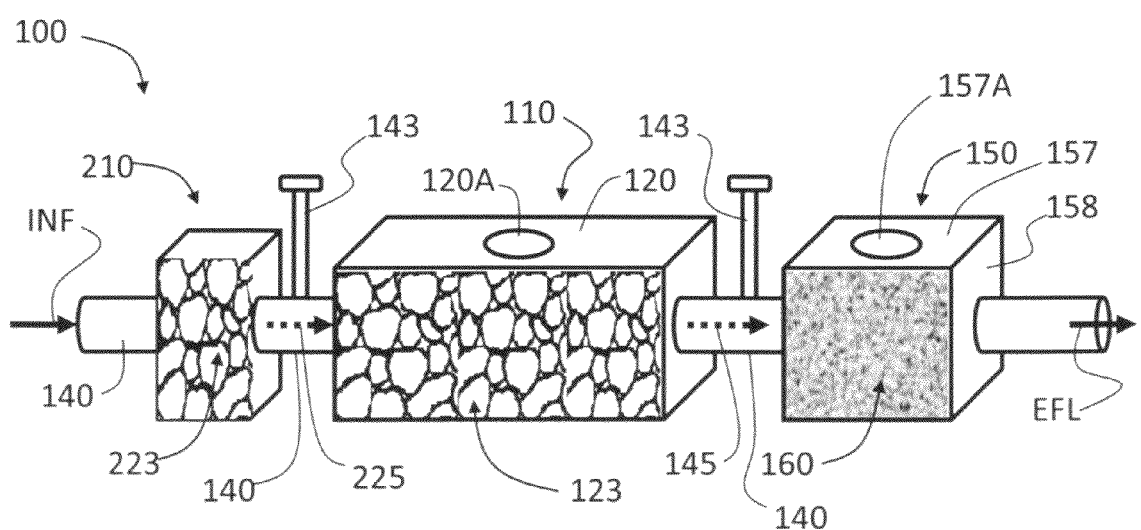

FIG. 3A and FIG. 3B are isometric views of example embodiments of P filter system 100 similar to those described above but that further include a replaceable pre-treatment process facilitated by a "replaceable filter unit" (RFU) 210 disposed upstream of MFU 110 and in fluid communication therewith. This type of P filter system 100 is referred to below in some cases as a "RFU+MFU+AU P filter system" for short.

Figure 3C:
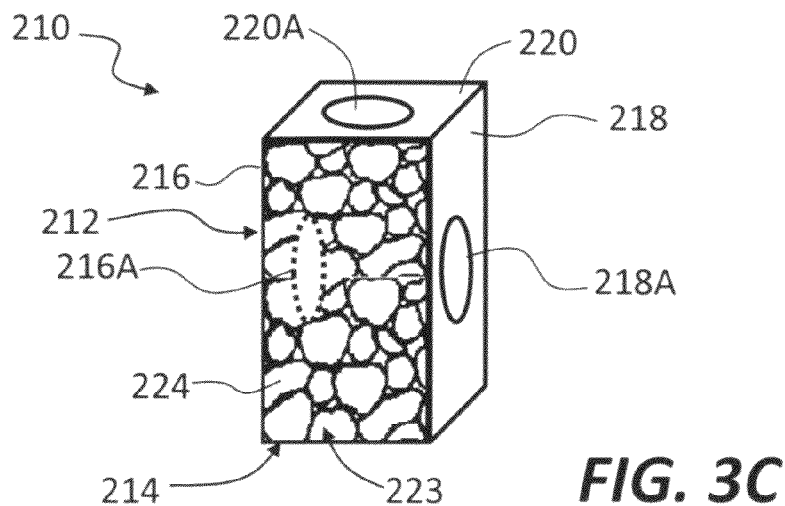
FIG. 3C is a close-up isometric view of an example RFU.

FIG. 3C is a close-up isometric view of an example RFU 210. RFU 210 includes a container (plastic, concrete, fiberglass or other prefabricated materials) 212, that defines a cavity 214 with an input end 216, an output end 218 and a top 220. Input end 216, output end 218 and top 220 have respective apertures 216A, 218A and 220A. Aperture 220A can be used for inspecting RFU 210. Apertures 216A and 218A facilitate the flow of influent INF into RFU 210 and the flow of the resulting RFU-filtered wastewater 225 out of the RFU to MFU 110.

Cavity 214 is either partially or completely filled with a mass 223 of loose pieces 224 of P-adsorbing material, such as steel slag, for example, crushed or palletized, or other material (e.g., calcium and/or iron based adsorbing material) having the ability to remove P from P-containing wastewater INF.

RFU 210 is thus similar to MFU 110, and in an example embodiment differs in size only. However, in various other embodiments, different types of containers 212 and different types of materials for mass 223 and sizes of pieces 224 could be used as compared to MFU 110. In an example, RFU 210 has a volume 10× to 20× smaller than that of the adjacent MFU 110.

Figure 3D:
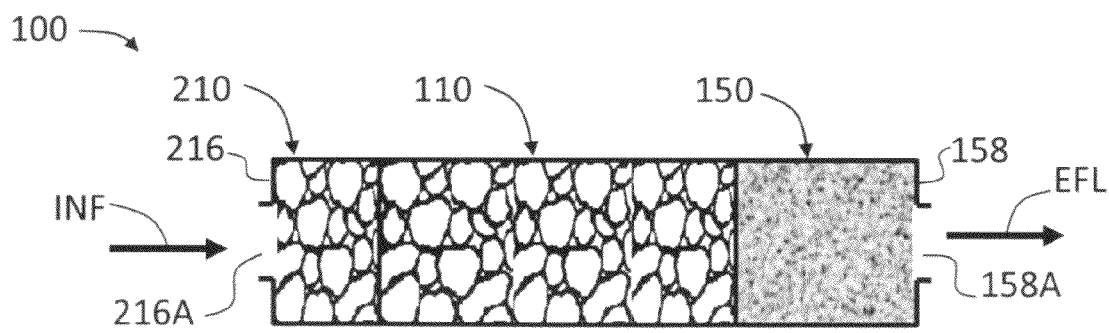
FIG. 3D is a side view similar to FIG. 1D, further showing the RFU immediately adjacent and upstream of the MFU.

FIG. 3D is similar to FIG. 1D and is a side view of an example embodiment where RFU 210, MFU 110 and AU 150 are configured immediately adjacent one another in a lateral configuration.

Figure 3E:
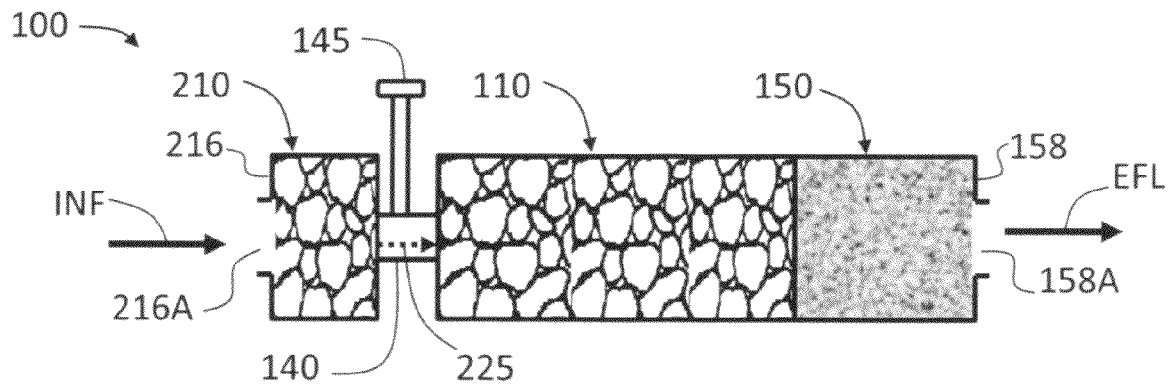
FIG. 3E is similar to FIG. 3D and shows the RFU spaced apart from the MFU and fluidly connected thereto via a pipe.

FIG. 3E is similar to FIG. 3D and shows RFU 210 spaced apart from MFU 110 and fluidly connected thereto via a pipe 140. This particular configuration may make it easier to remove and replace some or all of RFU 210 without damaging MFU 110, especially if heavy earth-moving equipment is needed to perform RFU maintenance.

In one embodiment of maintaining RFU 210, all of mass 223 is removed and replaced with a new mass 223. In another embodiment, only a portion of mass 223 is removed and replaced.

Modular RFU and AU

Figure 4A:
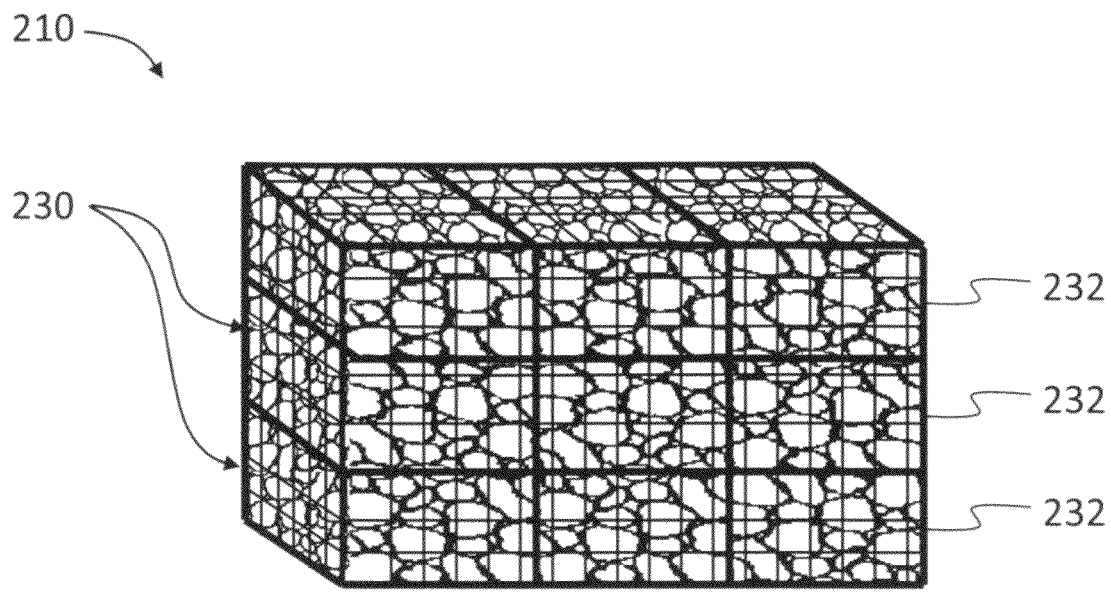
FIG. 4A is an isometric view of an example RFU formed by stacking a plurality of RFU modules.

FIG. 4A illustrates in example embodiment where RFU 210 is constituted by a number of RFU modules 230 each comprising stackable containers 232. In an example embodiment of RFU 210 suitable for use in situations involving treating relatively large influent volumes, e.g., in excess of 20 $m^3$/day, RFU filter modules 230 each contain about 80 kg of steel slag pieces 224. Each RFU module 230 contains a sub-portion of mass 223 so that collectively the stacked modules provide the entirety of mass 223. An example volume for a given RFU module 230 is about 35 .

Example containers 232 include various types of meshed bags, such as polymesh bags used for fruit and vegetable packing, or pre-fabricated perforated containers. The stacked RFU 210 configuration based on a plurality of RFU modules 230 allows for relatively easy periodic maintenance of the RFU with a earth-moving equipment, such as a backhoe. An example RFU maintenance time frame is about once per year, though in some cases RFU replacement may be required several times per year. The RFU maintenance time frame is generally determined by the P concentration in the P-containing wastewater INF and the flow rate. The RFU maintenance schedule should be selected so that P filter system 100 maintains its designed filtration capability over its intended lifespan.

The use of RFU modules 230 to constitute RFU 210 facilitates partial replacement of mass 223 by replacing only some of the RFU modules as part of the RFU maintenance.

Figure 4B:
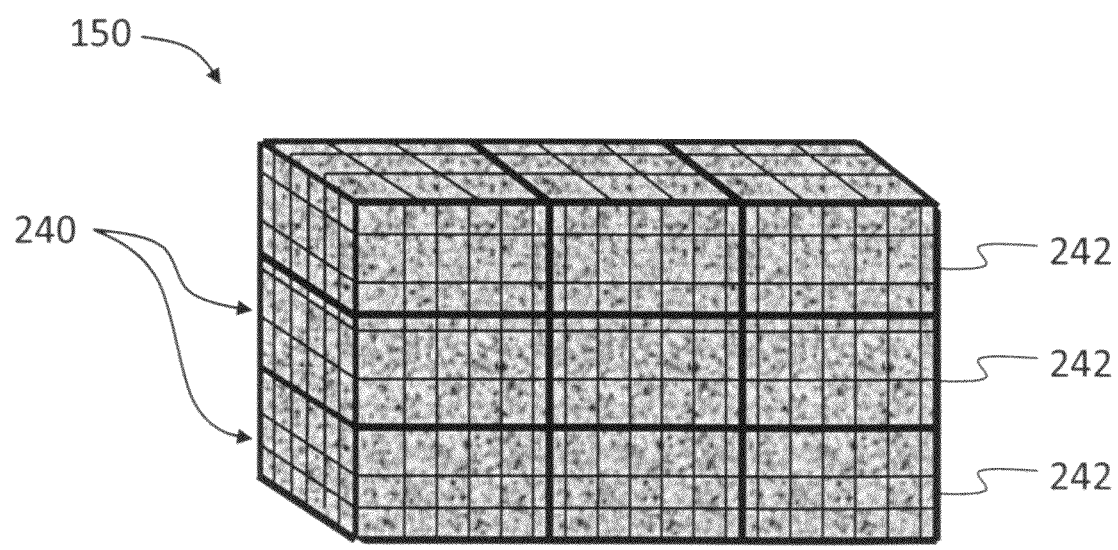
FIG. 4B is similar to FIG. 4A and illustrates an example AU formed by stacking a plurality of AU modules.

FIG. 4B is similar to FIG. 4A and illustrates an example embodiment of AU 150, wherein the AU comprises a plurality of stacked AU modules 240 each made up of a stackable container 242 containing a sub-portion of pH-reducing material (mass) 163.

Performance Data

Figure 5:
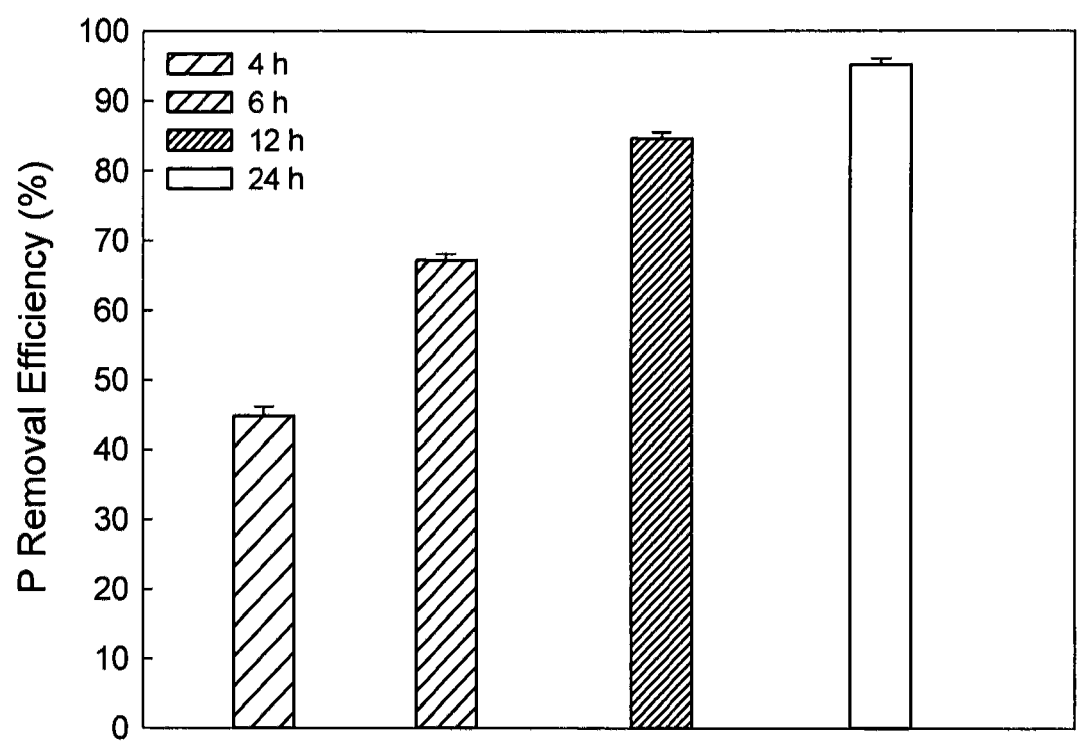
FIG. 5 is a bar graph that plots the average P removal efficiency (%) for an MFU employing the electric arc furnace (EAF) steel slag to treat dairy farm (mixed barnyard and milk parlor) effluent for four different hydraulic residence times (HRTs)

FIG. 5 is a bar graph that plots the average P removal efficiency (%) vs. time (days) over 60 days for four different HTRs, namely 4 h, 6 h, 12 h and 24 h for an example MFU 110 suitable for use in the P filter system 100 disclosed herein. The MFU 110 consisted of four small columns having 1 volume each and containing about 1.6 kg of EAF steel slag with pieces 124 having sizes in the range from 5 mm to 10 mm in diameter. The source of P-containing wastewater was a dairy farm. Columns were fed from the top to the bottom via peristaltic pumps set to introduce the P-containing wastewater INF to the different MFUs.

Figure 6A:
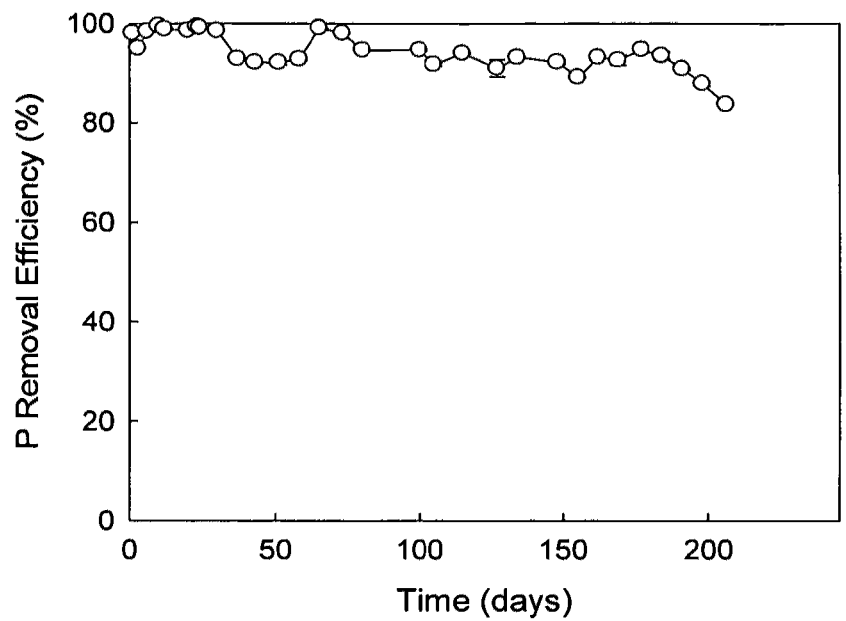
FIG. 6A and FIG. 6B plot the P removal efficiency (%) vs. time (days) for respective EAF steel slag MFUs, with FIG. 6A plotted for combined barnyard runoff and milk parlor effluent having average P concentration of 53.1 mg/L and running at 6 days (144 h) HRT, and FIG. 6B for wetland pretreated dairy effluent having average P concentration of 29.61 mg/L and running at 1 day (24 h) HRT.
Figure 6B:
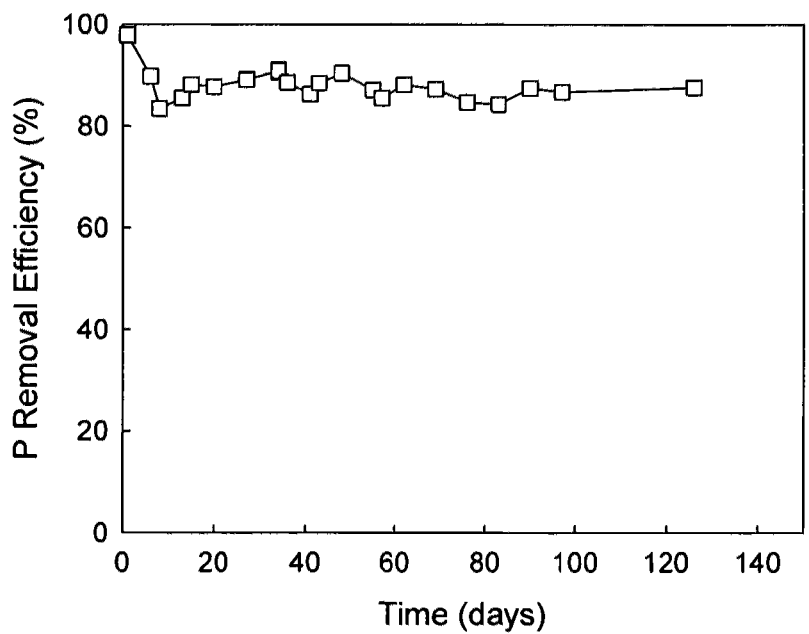

FIG. 6A and FIG. 6B plot the P removal efficiency (%) vs. time (days) for respective EAF steel slag MFUs 110 suitable for use in the P filter system of the present disclosure. The data of FIG. 6A is based on filtering P-containing wastewater INF formed from combined barnyard runoff and milk parlor effluent and having average P concentration of 53.1 mg/L, and the MFU having an HRT of 6 days (144 h). The data of FIG. 6B is based on the MFU filtering of wetland pretreated dairy P-containing wastewater having average P concentration 29.61 mg/L, with the MFU having an HRT of 1 day (24 h).

In the experiments described in FIG. 6A, the MFU 110 was formed from first and second MFUs arranged in series. The MFU was formed using two rectangular containers 112 (Quazite®, Strongewell, Lenoir City, Tenn.) 1.2 m wide×2.6 m long×1.2 m deep buried in the ground next to a 11.35 m³ underground milk parlor holding tank. Containers 112 had open bottoms and so were lined with a High Density Polyethylene (HDPE) liner 117. Only data from the first MFU are presented in FIG. 6A. The first MFU contained a mass 123 formed from 8,400 kg of EAF steel slag, with the slag pieces 124 having a size in the range from 20 mm to 50 mm in diameter and a pore volume of about 1.70 m³. The P-containing wastewater INF was pulled into the MFU directly from the dairy effluent flume tank using a pump controlled by a timer, at the rate of 75 gallons/day (283.9 L/d), resulting in a HRT of about 6 days.

Figure 7A:
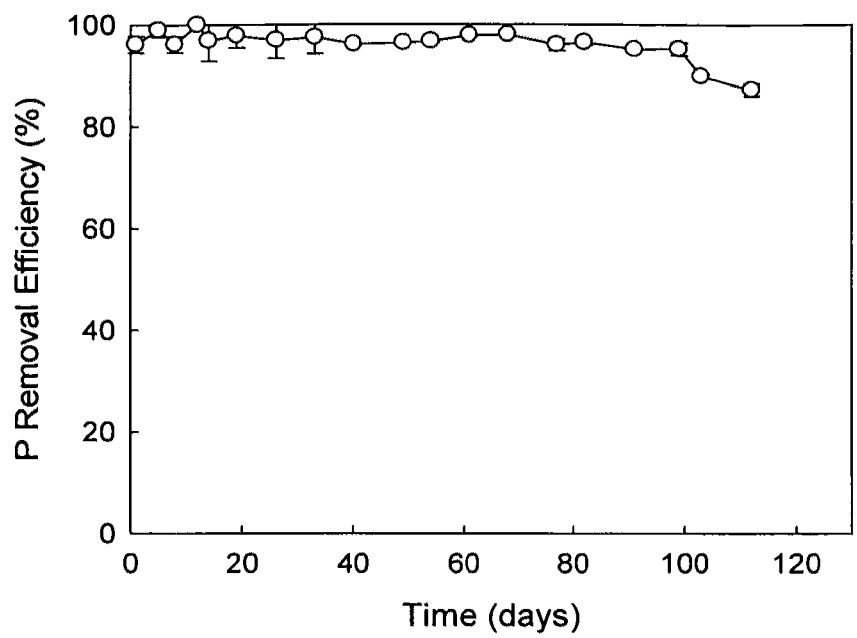
FIG. 7A and FIG. 7B are plots of the P removal efficiency (%) vs. time (days) using two different MFU+AU P filter systems according to the present disclosure, each having an HRT of about 24 hours employing blast furnace (BF) steel slag in the MFUs, and where the P-containing wastewater was from a sewage effluent from municipal treatment plant and had average P concentration of 6.11 mg/L.
Figure 7B:
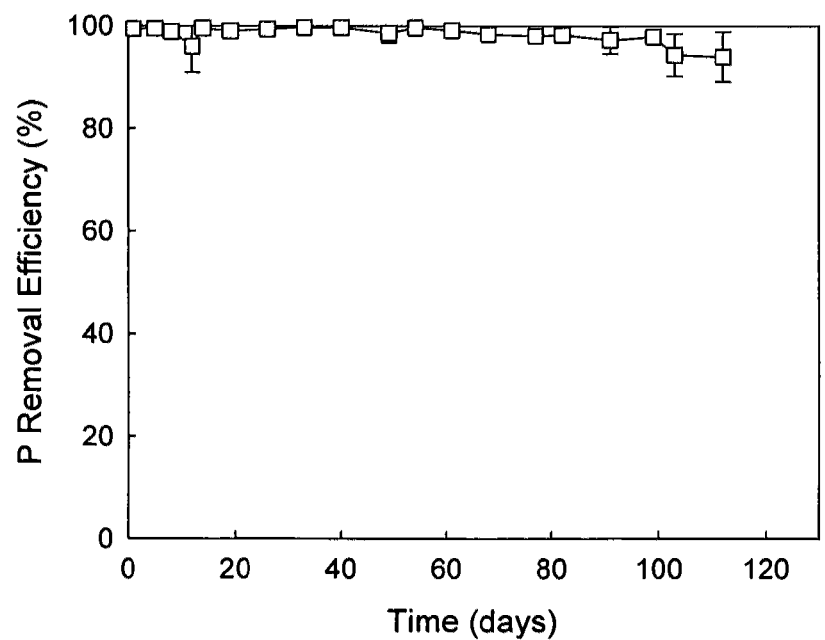

FIG. 7A and FIG. 7B are plots of the P removal efficiency (%) vs. time (days) using two different MFU+AU P filter systems 100 according to the present disclosure. The MFUs each employed blast furnace (BF) steel slag. The P-containing wastewater INF was sewage effluent from a municipal treatment plant and had average P concentration of 6.11 mg/L. The P filter system had an HRT of about 1 day (24 h).

The data presented in FIG. 7A averages two MFUs each having a rectangular shape, a volume of 1.32 (0.21 m long× 0.14 m wide×0.045 m deep) and packed with 2.27 kg of BF steel slag, with pieces 124 having a diameter in the range from 8 mm to 15 mm, resulting in a pore volume of 0.65. The data presented in FIG. 7B averages two MFUs each packed in columns (diameter 0.09 m, height 0.17 m) having a 1 volume and packed with 1.64 kg BF slag with pieces 124 having a diameter in the range from 8 mm to 1 5mm and pore volume of 0.5. The P-containing wastewater INF was secondary stage sewage effluent brought to the site from a sewage treatment plant twice per week. The P-containing wastewater INF was distributed to the MFUs via peristaltic pumps (0.65 to the rectangular MFUs and 0.5 to the columnar MFUs) to ensure an HRT of 1 day (24 h).

Figure 8A:
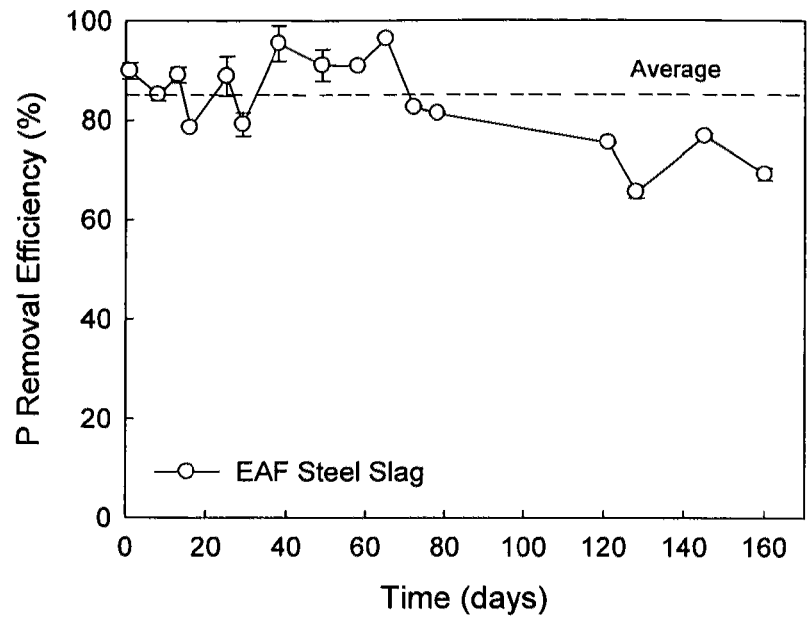
FIG. 8A and FIG. 8B are plots of the P removal efficiency (%) vs. time (days) for two different MFUs having different types of steel slag.
Figure 8B:
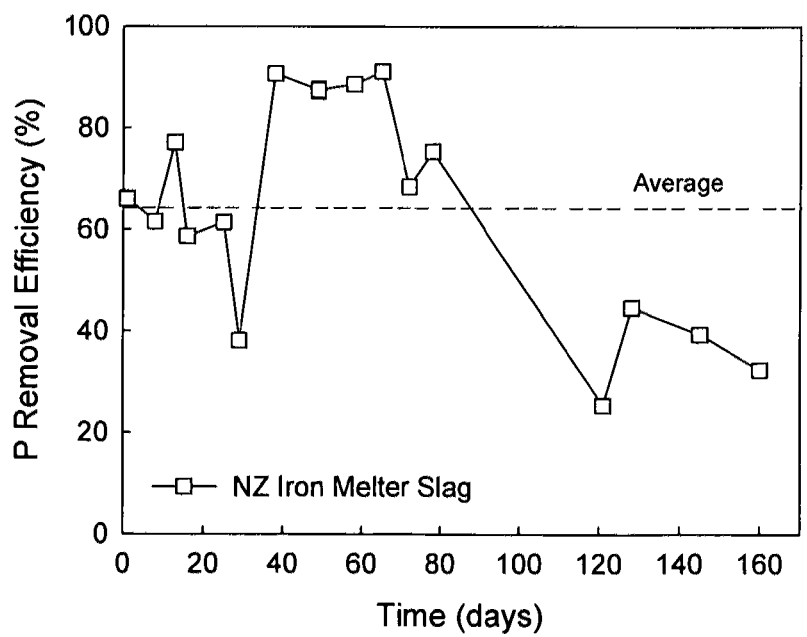

FIG. 8A and FIG. 8B are plots of the P removal efficiency (%) vs. time (days) for two different MFUs 110. Each MFU was formed using four cylindrical containers 112 each 0.9 m in diameter and 0.17 m high. The MFU of FIG. 8A used EAF steel slag from Quebec, Canada while the MFU of FIG. 8B used iron melter slag manufactured in New Zealand, with each type of slag having pieces 124 ranging in size from 10 mm to 20 mm. The P-containing wastewater INF was a wetland pre-treated dairy effluent having an average P concentration of 26.7 mg/L. The P-containing wastewater INF was pumped into the MFU's using peristaltic pumps so that the MFU's had a HRT of about 1 day (24 h).

Figure 9A:
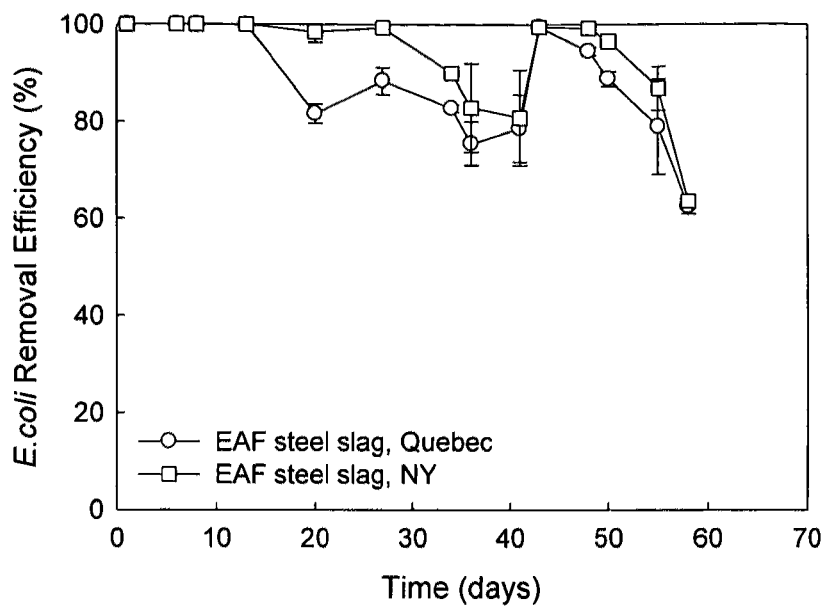
FIG. 9A plots the *Escherichia coli* (*E. coli*) removal efficiency vs. time (days) for two different MFUs having the same type of steel slag (EAF) originating from different sources (Quebec, Canada, and New York, USA) operating at a 24 h HRT and for P-containing wastewater generated by wetland pre-treated dairy effluent.

FIG. 9A plots the *E. coli* removal efficiency vs. time (days) for two different MFUs having the same type of steel slag (EAF) originating from different sources (Quebec, Canada (circles) and New York, USA (squares)) operating at a 1 day (24 h) HRT and for P-containing wastewater INF generated by wetland pre-treated dairy effluent.

Figure 9B:
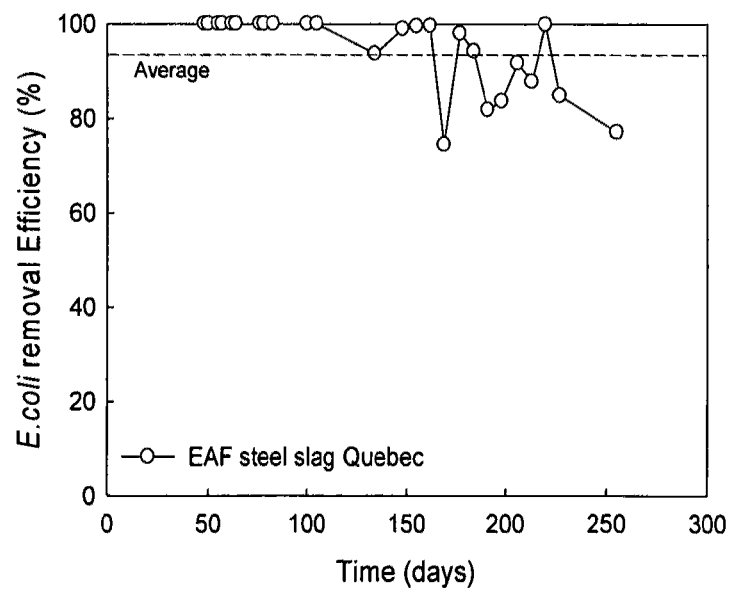
FIG. 9B is plot of *E. coli* removal efficiency vs. time (days) for a slag-based MFU treating P-containing wastewater in the form of mixed barnyard runoff and milk parlor effluent, with the MFU operating at 6 days (144 h) HRT.

FIG. 9B is similar to FIG. 9A and plots the *E. coli* removal efficiency vs. time (days) for a slag-based MFU treating P-containing wastewater in the form of mixed barnyard runoff and milk parlor effluent, with the MFU 110 operating at 6 days (144 h) HRT.

Figure 10A:
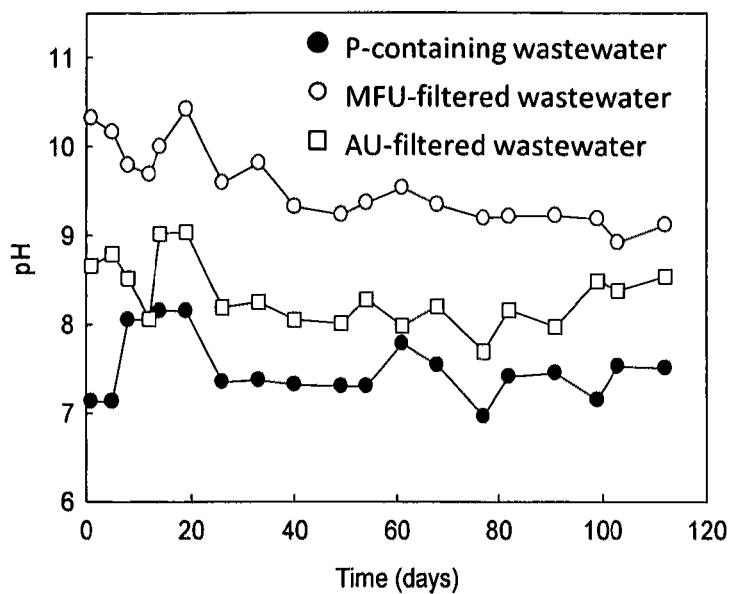
FIG. 10A and FIG. 10B plot the pH vs. time (days) for the P-containing wastewater, the MFU-filtered wastewater and the AU filtered wastewater for two example MU+AU P filter systems.
Figure 10B:
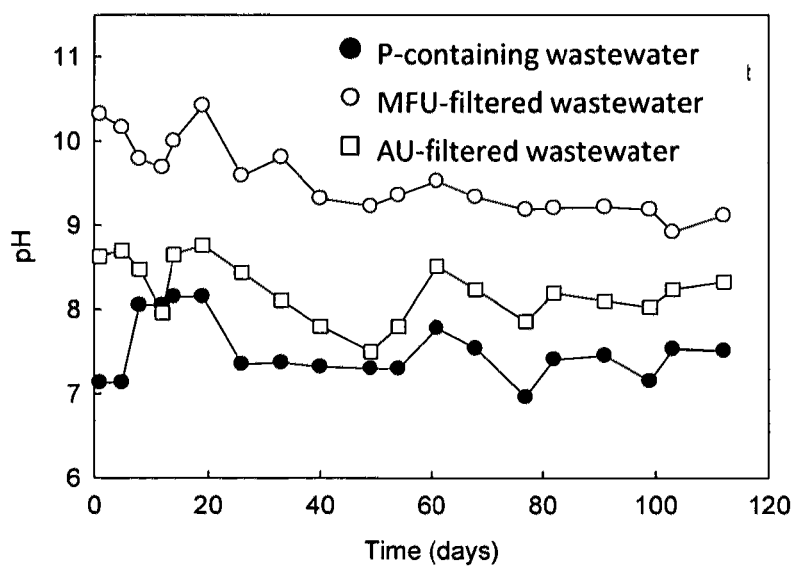

FIG. 10A and FIG. 10B plot the pH vs. time (days) for two different an MFU+AU P filter systems 100. The P filter system 100 for FIG. 10A utilized an MFU 110 having BF steel slag and an AU 150 having shale, while the P filter system for FIG. 10B utilized an MFU having BF steel slag and an AU having charcoal. The MFU 110 in both cases was the rectangular MFU described above in connection with FIG. 7A. The Shale-based and charcoal-based AUs were both 0.115 m long and 0.08 m wide, with shale-based AU being 0.035 m deep and the charcoal-based AU being 0.03 m deep, resulting in respective AU total volumes of 0.28 and 0.32.

Example P Filter System

Figure 11A:
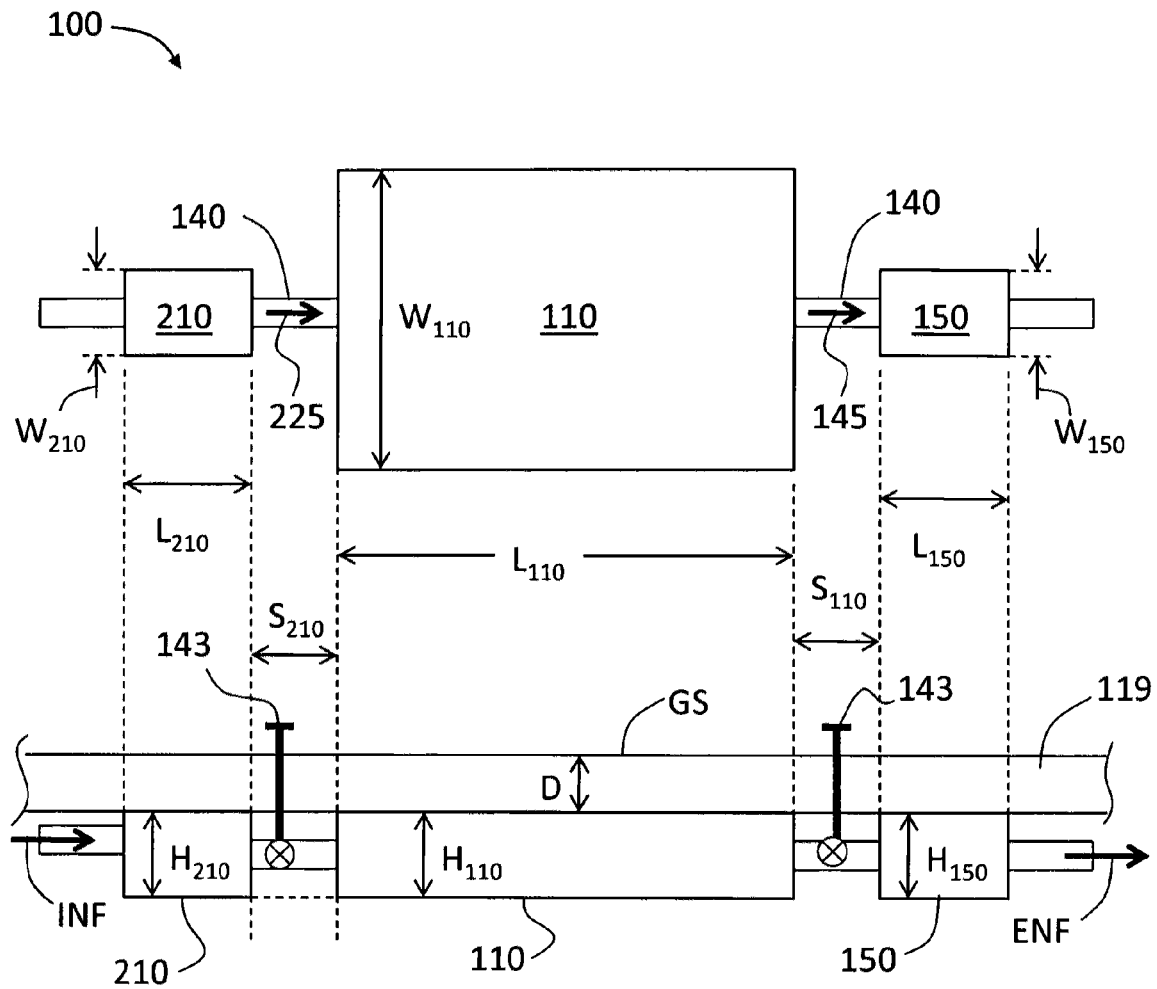
FIG. 11A shows both a top-down view and the corresponding side view of an example P filter system, showing a number of different dimensions associated with the system in connection with describing a specific example embodiment of a P filter system.

FIG. 11A presents a top-down view and the corresponding side view of an example P filter system 100, showing a number of different dimensions associated with the system. An example P filter system 100 is now described that has specific dimensions, material properties and performance characteristics.

RFU 210 has dimensions $(W_{210} \times L_{210} \times H_{210}) = (1.2 \text{ m} \times 2\text{m} \times 1.2 \text{ m})$ and is filled with mass 223 (see FIGS. 3A and 3C) comprising EAF steel slag with pieces 224 having sizes in the range from 10 mm to 30 mm. The total amount of EAS steel slag in RFU 210 is about 6 tons. The EAF steel slag is contained in 100 RFU modules 230 in the form of 100 bags (i.e., stackable containers 232) each containing about 60 Kg of steel slag. The RFU modules 230 are arranged in a stacked configuration to form RFU 210 (see FIG. 4A). Example bags are cylindrical in shape and have dimensions of 0.24 m in diameter and 0.60 m in length. Bags of other shapes can also be employed.

Output end 218 of RFU 210 is spaced apart from input end 116 of MFU 110 by a spacing $S210=1.5$ m and is fluidly connected to the MFU via PVC piping 140. A valve 143 is cooperatively arranged with PVC piping 140 so that it can adjust the flow of RU-filtered wastewater 225 to MFU 110. In an example, only some (e.g., about 20 to 25) of the 100 or so slag-filled bags constituting RFU 210 are replaced annually as part of the overall maintenance of P filter system 100.

MFU 110 has dimensions $(W_{110} \times L_{110} \times H_{110}) = (10 \text{ m} \times 5 \text{m} \times 1.2 \text{ m})$ and is filled with mass 123 (see FIG. 3A) comprising EAS steel slag with pieces 124 having sizes in the range of 10 mm to 30 mm. The total amount of EAF steel slag in MFU 110 is about 135 tons. MFU container 112 is formed from an HDPE liner 171 (see e.g., FIG. 1B). Output end 118 of MFU 110 is spaced apart from input end 156 of AU 150 by a spacing $S110=1$ m and is fluidly connected to the AU via PVC piping 140. A valve 143 is cooperatively arranged with PVC piping 140 so that it can adjust the flow of MFU-filtered wastewater 145 to AU 150.

The combination of RFU 210 and MFU 110 is capable of producing MFU-filtered wastewater 145 having a total P content of as low as 0.15 mg/L.

AU 150 has dimensions $(W_{150} \times L_{150} \times H_{150}) = (1.2 \text{ m} \times 2 \text{ m} \times 1.2 \text{ m})$ and is filled with mass 163 (see FIG. 3A) comprising pieces 163 of charcoal, coal, shale, and/or wood chips, with sizes in the range of 10 mm to 30 mm. An output PVC pipe 140 is connected to output end 158 and to aperture 158A therein (see FIG. 3B).

An earthen layer 119 composed of soil and sod and having a depth D of about 0.1 m covers P filter system 100. This provides easy access to P filter system 100 for flow control (via valves 143) and maintenance, including periodic partial or complete RFU replacement.

filter system 100 of FIG. 11 is suitable for a variety of wastewater P-filtering applications for a daily flow volume of about 20 m³/day and higher with the P-containing wastewater INF having a P concentration of up to about 10 mg/L P. The HRT of the example P filter system is between 18 h and 24 h HRT.

Figure 11B:
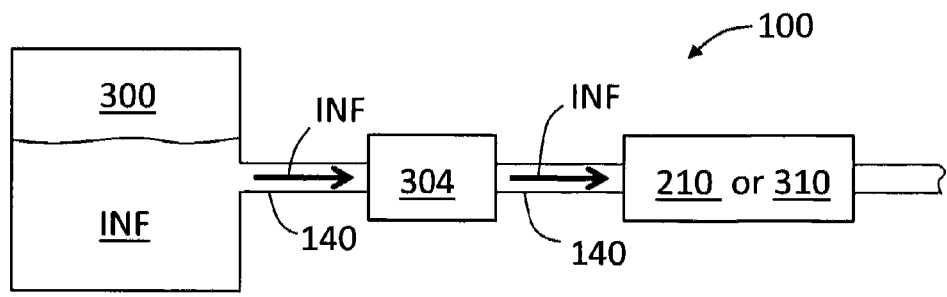
FIG. 11B is a schematic side view of a portion of the P filter system of FIG. 11A illustrating an example embodiment wherein the P-containing wastewater is held in a container and a pump is used to pump the wastewater to the downstream RFU or the MFU.

FIG. 11B is a schematic side view of a portion of the P filter system 100 of FIG. 11A illustrating an example embodiment wherein the P-containing wastewater INF is held in a container 300 and a pump 304 is used to pump the wastewater to the downstream RFU 210 or MFU 110, depending on the particular configuration of the P filter system. Note that the operation of pump 304 can be adjusted to control the HRT of the P filter system.

Method of P-Filtering Wastewater

Aspects of the disclosure include methods of filtering (treating) P-containing wastewater INF that has a first amount of P. The method includes flowing the P-containing wastewater INF through MFU 110 to generate MFU-filtered wastewater 145 having a second amount of P less than the first amount of P and having a first pH. The method also includes flowing the MFU-filtered wastewater 145 through AU 150 to form AU-filtered wastewater EFL having a second pH that is lower than the first pH.

Another aspect of the filtering method includes arranging MFU 110 and AU 150 underground and flowing the P-containing wastewater INF first through an underground RFU 210, wherein some or all of the RFU is more removable from the ground than the MFU so that some or all of the RFU can be replaced. The RFU includes the aforementioned P-adsorbing material, which in one example is the same material as used in the MFU. In this case, RFU 210 converts the P-containing wastewater INF to RFU-filtered wastewater 225, which is then filtered by MFU 110 to form the MFU-filtered wastewater 145. The method also includes passing this MFU-filtered wastewater 145 through AU 150 to form AU-filtered wastewater EFL having a second pH that is lower than the first pH.

Another aspect of the filtering method is where the P-containing wastewater INF contains an initial amount of *Escherichia coli* (*E. coli*), and the method further comprises forming MFU-filtered wastewater to have an amount of *E. coli* that is 50% or less than the initial amount of *E. coli*.

In examples of the filtering methods, a pump 304 is used to pump the P-containing wastewater to RFU 210 or MFU 110, such as shown in the P filter system 100 of FIG. 11B.

It will be apparent to those skilled in the art that various modifications and variations can be made to the present disclosure without departing from the spirit and scope of the disclosure. Thus it is intended that the present disclosure cover the modifications and variations of this disclosure provided they come within the scope of the appended claims and their equivalents.

What is claimed is:

1. A system for removing phosphorous (P) from P-containing wastewater, comprising:
    a source of the P-containing wastewater, wherein the P-containing wastewater comprises has an initial pH and organic matter;
    a main filter unit (MFU) in fluid communication with the source of the P-containing wastewater to receive the P-containing wastewater, wherein the MFU is substantially filled with steel slag, wherein the P-containing wastewater passes through the steel slag to form MFU-filtered wastewater from the P-containing wastewater by removing P from the P-containing wastewater, and the MFU-filtered wastewater has a first pH greater than the initial pH;
    a pH adjusting unit (AU) in fluid communication with the MFU to receive the MFU-filtered wastewater, wherein the AU is predominantly filled with a carbon rich material having microorganisms attached thereto, wherein said microorganisms consume the organic matter in the MFU-filtered wastewater and produce carbon dioxide gas, wherein the MFU-filtered wastewater flows through the carbon rich material and combines with the carbon dioxide gas produced by the microorganisms to form AU-filtered wastewater, and wherein the carbon dioxide gas combines with the MFU-filtered wastewater to lower the first pH of the MFU-filtered wastewater such that the AU-filtered wastewater has a second pH that is lower than the first pH.

2. The system of claim 1, wherein the MFU and the AU are one of:
    a) arranged immediately adjacent one another; and
    b) spaced apart from one another and fluidly connected by one or more pipes.

3. The system of claim 1, wherein the steel slag is crushed or pelletized steel slag.

4. The system of claim 3, wherein the carbon rich material consists of at least one of charcoal, coal, shale and wood chips.

5. The system of claim 1, wherein the MFU-filtered wastewater has a total P concentration of 1 mg/L or less, and wherein the second pH of the AU-filtered wastewater is equal to or less than 9.

6. The system of claim 1, wherein the MFU has a hydraulic residence time (HRT) of 12 hours or greater.

7. The system of claim 1, wherein the P-containing wastewater further comprises an initial amount of *Escherichia coli* (*E.coli*), and wherein the MFU-filtered wastewater reduces said initial amount of *E. coli* by at least by 50%.

8. The system of claim 1, wherein: the MFU includes a container that defines an enclosed cavity; the container of the MFU comprises at least two apertures, a first aperture configured to receive the P-containing wastewater and a second aperture configured to output the MFU-filtered wastewater; and the enclosed cavity of the MFU is substantially filled with the steel slag.

9. The system of claim 8, wherein: the AU includes a container that defines an enclosed cavity; the container of the AU comprises at least two apertures, a first aperture configured to receive the MFU-filtered wastewater and a second aperture configured to output the AU-filtered wastewater; and the enclosed cavity of the AU is predominantly filled with the carbon rich material.

10. The system of claim 1, further comprising a container unit comprising a first compartment and a second compartment separated by a dividing wall, wherein the first compartment contains the MFU and the second compartment contains the AU.

* * * * *